(12) United States Patent
Olson

(10) Patent No.: US 6,673,247 B2
(45) Date of Patent: Jan. 6, 2004

(54) SLUDGE DEWATERING AND PASTEURIZATION PROCESS

(75) Inventor: Roger J. Olson, Port Angeles, WA (US)

(73) Assignee: FKC Co., Ltd., Port Angeles, WA (US)

( * ) Notice: Subject to any disclaimer, the term of this patent is extended or adjusted under 35 U.S.C. 154(b) by 130 days.

(21) Appl. No.: 09/921,722

(22) Filed: Aug. 3, 2001

(65) Prior Publication Data

US 2002/0043505 A1 Apr. 18, 2002

Related U.S. Application Data

(60) Provisional application No. 60/240,483, filed on Oct. 13, 2000.

(51) Int. Cl.$^7$ ................................................ C02F 11/14
(52) U.S. Cl. ..................... 210/710; 100/38; 100/117; 100/339; 100/340; 210/724; 210/725; 210/727; 210/764; 210/766; 210/737; 210/768
(58) Field of Search .................... 100/38, 339, 340, 100/117; 210/609, 710, 724, 725, 727, 737, 749, 752, 764, 766, 768; 71/12, 13

(56) References Cited

U.S. PATENT DOCUMENTS

| | | |
|---|---|---|
| 3,939,763 A | 2/1976 | Sato |
| 3,943,034 A | 3/1976 | Wallen |
| 4,041,854 A | 8/1977 | Cox |
| 4,119,495 A | 10/1978 | Belyaev et al. |
| 4,270,279 A | 6/1981 | Roediger |
| 4,380,496 A | 4/1983 | Maffet |
| 4,661,290 A * | 4/1987 | Sauda et al. ................. 425/308 |
| 4,718,337 A * | 1/1988 | Wiederkehr .................. 100/75 |
| 4,741,836 A * | 5/1988 | Jackman ..................... 210/709 |
| 5,013,458 A * | 5/1991 | Christy et al. ......... 405/129.27 |
| 5,178,776 A | 1/1993 | Graziano et al. |
| 5,196,043 A | 3/1993 | Wurtz |
| 5,435,923 A | 7/1995 | Girovich |
| 5,489,383 A | 2/1996 | Yoshikawa |
| 5,516,427 A | 5/1996 | Yoshikawa |
| 5,554,279 A * | 9/1996 | Christy ....................... 210/149 |
| 5,635,069 A | 6/1997 | Boss et al. |
| 5,736,007 A * | 4/1998 | Duffy ........................... 162/53 |
| 5,792,370 A | 8/1998 | Whipple |
| 5,853,450 A | 12/1998 | Burnham et al. |
| 5,888,307 A | 3/1999 | Solheim |
| 6,103,191 A | 8/2000 | Luker |
| 6,113,789 A | 9/2000 | Burke |
| 6,409,788 B1 * | 6/2002 | Sower ........................... 71/11 |

OTHER PUBLICATIONS

United States Environmental Protection Agency, Office of Wastewater Management, "A Plain English Guide to the EPA Part 503 Biosolids Rule," EPA/832/R–93/003, Sep. 1994.

U.S. Government Printing Office (via GPO Access), "Pathogens and Vector Attraction Reduction" Title 40, vol. 22, Parts 503.32 and 503.33, http://frweb.../get–cfr.cgi?TITLE=40&PART=503&SECTION=32&YEAR=2000&TYPE=TEX, Rev. Jul. 1, 2000, (Apr. 5, 2001).

* cited by examiner

Primary Examiner—Peter A. Hruskoci
(74) Attorney, Agent, or Firm—Christensen O'Connor Johnson Kindness PLLC

(57) ABSTRACT

A process for dewatering and reducing pathogens in liquid waste sludge having a liquid component and a sludge solids component. Alkaline material is added to the liquid waste sludge. Flocculent may then be mixed with the liquid waste sludge. The liquid waste sludge is then fed into a screw press having a screw. The screw simultaneously heats and dewaters the liquid waste sludge for a sufficient period of time and at a predetermined temperature for the sludge solids component from the screw press to be pasteurized. An apparatus is also provided for carrying out the process for dewatering and reducing pathogens in liquid waste sludge.

15 Claims, 9 Drawing Sheets

SLUDGE DEWATERING AND PASTEURIZATION PROCESS

CROSS-REFERENCE TO RELATED APPLICATION

The present application claims the benefit of U.S. Provisional Application No. 60/240,483, filed Oct. 13, 2000.

FIELD OF THE INVENTION

The invention relates to the treatment of liquid waste sludge, and more particularly to the dewatering and pasteurization of liquid waste sludge.

BACKGROUND OF THE INVENTION

Many municipalities produce liquid sludge as an end product of sewage treatment. This sludge may contain hazardous pathogens, but can be turned into a beneficial and benign solid product, suitable for use as residential or agricultural fertilizer, by dewatering and treating for pathogen deactivation. One of the most common methods for deactivating liquid sludge or dewatered sludge solids is heat treatment to pasteurize the sludge. In the absence of complete pasteurization of the sludge, it is also desirable to reduce vector transmission of pathogens, which can result from attraction of rodents, birds or insects to the sludge. While municipal waste sludge is focused on primarily herein, the same concerns may arise from other types of sludge, such as fish and other food processing waste sludge, that require pathogen reduction.

Many governmental regulatory agencies have established, or are in the process, of establishing standards for the degree of treatment required of sludge before it can be safely and legally recycled or otherwise disposed. In the United States, these regulations are set forth in 40 C.F.R. 503.32–503.33 and publication EPA/832/R-93/003 "A Plain English Guide to the EPA Part 503 Biosolids Rule" (collectively, hereinafter "EPA Part 503"), which sets out rules and guidelines for the treatment of liquid waste sludge established by the Environmental Protection Agency (EPA). Reference herein to these US Federal Regulatory standards are to be understood to refer to similar or corresponding technical or governmental standards in other jurisdictions.

During sludge treatment, dewatering may conventionally be carried out in a screw press. U.S. Pat. No. 3,939,763 issued to Sato and assigned to Fukoku Kogyo Company Limited, the disclosure of which is hereby expressly incorporated by reference, discloses one such continuous screw press. The press includes a rotatable screw shaft, a screw drum secured to the screw shaft, a screw blade spirally arranged on the outer surface of the screw drum, an outer drum having a number of small filtering holes, an inlet for introducing raw materials to be pressed into a space between the screw drum and outer drum and an outlet for discharging pressed materials. The continuous press further includes steam introduction circuitry for heating the screw drum and blade from the inside of the screw drum through the screw shaft. While heating the screw in this fashion may aid dewatering, the degree of heating provided by this device is substantially insufficient for pasteurization during the average residence time of the sludge within the continuously operating screw press.

Heat treatment of sludge for pasteurization typically is carried out after dewatering. U.S. Pat. No. 4,380,496 to Maffet makes a passing reference to heating sludge during dewatering, stating "However, it has recently been discovered that heat may be advantageously applied during dewatering of certain secondary sludges." (In Col. 7, Lines 55–57.) Maffet also states, "The heat may be applied by a heating element in contact with the upper surface of the porous wall and should heat the sludge to an average temperature of not over 80° C." (Col. 7, Lines 58–60).

However, there are several problems with the approach of Maffet. While Maffet applies heat during dewatering, Maffet does not provide for simultaneous pasteurization and dewatering of liquid waste sludge. One problem has to due with the retention time of the screw of Maffet. Table 5-3 of EPA Part 503 requires that, for biosolids with 7% solids or greater, the "Temperature of biosolids must be 50° C. or higher for 20 minutes or longer". If the temperature is lower than 72° C., the retention time must be greater than 20 minutes as determined by a formula discussed in the detailed description. In screw presses, the retention time of the sludge in the press is inversely related to the screw speed (rpm). As the screw speed is increased, the retention time decreases. As the screw speed decreases, the retention time increases. Higher screw speeds result in shorter retention times. Lower screw speeds result in longer retention time. Assuming 100% conveying efficiency, the retention time can be calculated by dividing the number of flights on the screw by the screw speed (rpm). Maffet describes a "highly effective" screw design in column 8, line 28, with a total of seven flights of the screw conveyor used within the porous wall. Maffet describes the screw speed of his apparatus in column 7, line 41, as "ranging from about 10 to about 150 rpm, or even more rapidly if desired". Maximum retention time of the sludge in the porous wall section of the Maffet press will be at the minimum speed, (10 rpm) so 7 flights divided by 10 rpm results in a 0.7 minute retention time. Being very conservative and assuming 50% conveying efficiency (the sludge spirals with the screw rather than in a straight line through the press), and assuming the number of flights is doubled to 14, the retention time is calculated to be 2.8 minutes. Thus, the retention time in Maffet's press is not sufficient to pasteurize the sludge.

Further, the heating mechanism disclosed in Maffet is insufficient to raise the temperature of the liquid waste sludge to a sufficient degree for pasteurization. Maffet discloses heating the sludge "by a heating element in contact with the upper surface of the porous wall." (Col. 7, Lines 58–60). The externally applied heat must heat the screen, which then must heat the outer sludge layer, and then the heat must penetrate down through the sludge mass down to the screw. While the heat is trying to flow inwards, cold water from the sludge is flowing outwards from the screw shell, out through the sludge, out through the porous wall and past the heating elements. The water from the sludge will move faster outwards than the heat can move inwards. Heat from the heating elements will be carried away with the water being pressed from the sludge. Thus, there are serious thermodynamic problems with his method of using "a heating element in contact with the upper surface of the porous wall" to heat the entire sludge mass which would prevent this method from working at the screw speeds/retention times disclosed.

SUMMARY OF THE INVENTION

The present invention provides a process for dewatering and reducing pathogens in liquid waste sludge having a liquid component and a solids component. The liquid waste sludge is fed into a screw press. The liquid waste sludge is simultaneously heated and dewatered in the screw press for a sufficient period of time and at a predetermined temperature for the high solids, dewatered sludge that is discharged from the screw press to be completely or nearly pasteurized at the time of discharge.

In another embodiment of the present invention, a process is provided for dewatering and reducing pathogens in liquid waste sludge having a liquid component and a sludge solids component. Alkaline material is added to the liquid waste sludge. Flocculent may then be mixed with the liquid waste sludge. The liquid waste sludge is then fed into a screw press having a screw. The screw simultaneously heats and dewaters the liquid waste sludge for a sufficient period of time and at a predetermined temperature for the dewatered sludge discharged from the screw press to be completely or nearly pasteurized.

In a further aspect of the invention, flocculent, or a combination of flocculent and coagulant, may be added to the liquid waste sludge prior to simultaneous heating and dewatering the liquid waste sludge.

In a still further aspect of the invention, the pasteurized and dewatered sludge solids are discharged from the screw press having a water content between 90% and 40% by weight, i.e., a total solid content of 10–60%.

In a still further aspect of the invention, the liquid waste sludge may be prethickened prior to the simultaneous heating and dewatering step by removing at least a portion of the liquid from the liquid waste sludge.

The present invention is also directed to an apparatus for dewatering, pasteurizing, and vector attraction reduction in liquid waste sludge, having a liquid component and a sludge solids component. The apparatus includes an alkaline introduction station, a flocculent introduction station and a screw press. A first conduit supplies liquid waste sludge to the alkaline introduction station. A second conduit supplies alkaline material to the alkaline introduction station, where the alkaline material is combined with the liquid waste sludge. The screw press has a liquid waste sludge inlet, a sludge solids outlet, an outer screen, and a screw rotatably located within the outer screen. The screen allows the liquid component to pass through and retains a majority of the sludge solids component. The screw has a heating mechanism for heating the liquid waste sludge. A third conduit supplies alkaline sludge mixture to the screw press inlet. A flocculent introduction station supplies flocculent to the alkaline sludge mixture in the third conduit, prior to the liquid waste sludge being introduced into the screw press.

In a still further aspect of the invention, the screw press further includes a second heating mechanism which may be a heated drum with a perforated or non-perforated inner wall in place of a portion of the screw press outer screen.

In a still further aspect of the invention, the apparatus for dewatering, pasteurizing, and vector attraction reduction in liquid waste sludge further includes a prethickener device located in the third conduit for removing a portion of the liquid from the liquid waste sludge prior to entry into the screw press.

The present invention thus provides processes and apparatus that enable the simultaneous dewatering and heating of liquid waste sludge, where the heat applied to the sludge while the sludge passes through the screw press for dewatering is sufficient to pasteurize the sludge solids component. In the preferred embodiment, a device constructed in accordance with the present invention heats liquid waste sludge from the inside utilizing a heated screw. Thus the flow of water radially outward from the sludge and the heat conduction flow are in the same direction. The liquid waste sludge next to the screw is heated as the liquid waste sludge is compressed between the screw and a screw press screen. The hot water migrates outward from the screw through the liquid waste sludge and out the screen. This flow aids in heat flow from the screw to the liquid waste sludge near the porous wall. Further, the screw press of the present invention operates at a screw speed range, with a given spiral pitch, to achieve a sludge retention time range allowing the sludge to come up to the required temperature for pasteurization and then be slowly conveyed at that temperature for the required amount of time for pasteurization.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides processes and systems that enable the simultaneous dewatering and heating of liquid waste sludge, where the heat applied is sufficient to pasteurize the sludge solids component.

Figure 1:
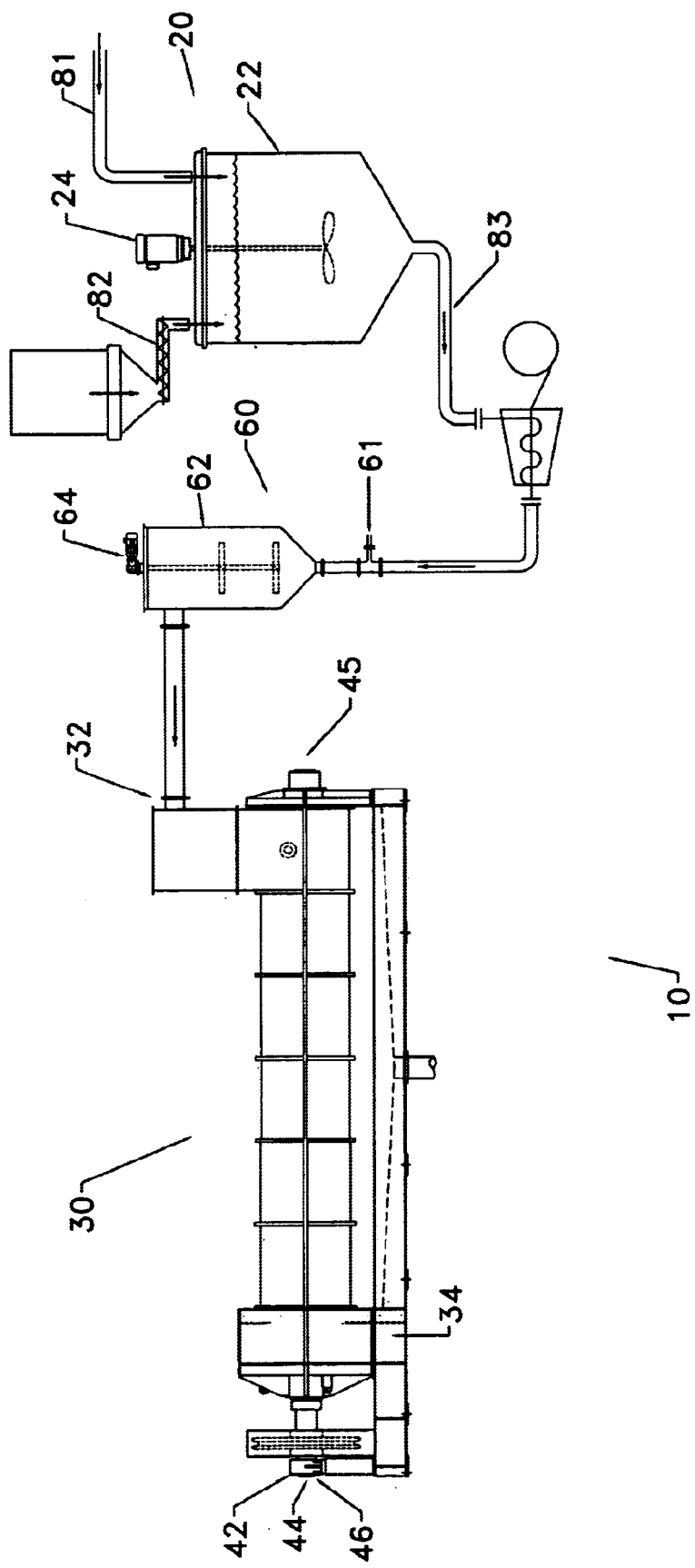
FIG. 1 shows a sludge dewatering and pasteurization system of the present invention including an alkaline introduction station and a flocculent introduction station.

Referring to FIG. 1, the present invention is directed to a sludge dewatering and pasteurization system 10 for dewatering, pasteurizing, and vector attraction reduction in liquid waste sludge, having a liquid component and a solids component. The system 10 includes an alkaline introduction station 20, a screw press 30, and a flocculent introduction station 60. A first conduit 81 supplies liquid waste sludge to the alkaline introduction station 20. The liquid waste sludge may be supplied to the alkaline introduction station 20 from a clarifier, digester or other storage or blend tank or reservoir. A second conduit 82 supplies alkaline material to the alkaline introduction station 20, where the alkaline material is combined with the liquid waste sludge. The screw press 30 has a liquid waste sludge inlet 32 and a sludge solids outlet 34. A third conduit 83 supplies alkaline sludge mixture from the alkaline introduction station 20 to the screw press inlet 32. A flocculent introduction station 60 supplies flocculent to the alkaline sludge mixture in the third conduit 83, prior to the liquid waste sludge being introduced into the screw press 30.

The alkaline introduction station 20 may be an in-line mixer, a separate mixing tank 22, or other mechanism for adding alkaline material to the liquid waste sludge. The alkaline material may be suitably mixed with the liquid waste sludge by fluid flow, a static mixing device, or by a mechanical mixing device 24.

Figure 2:
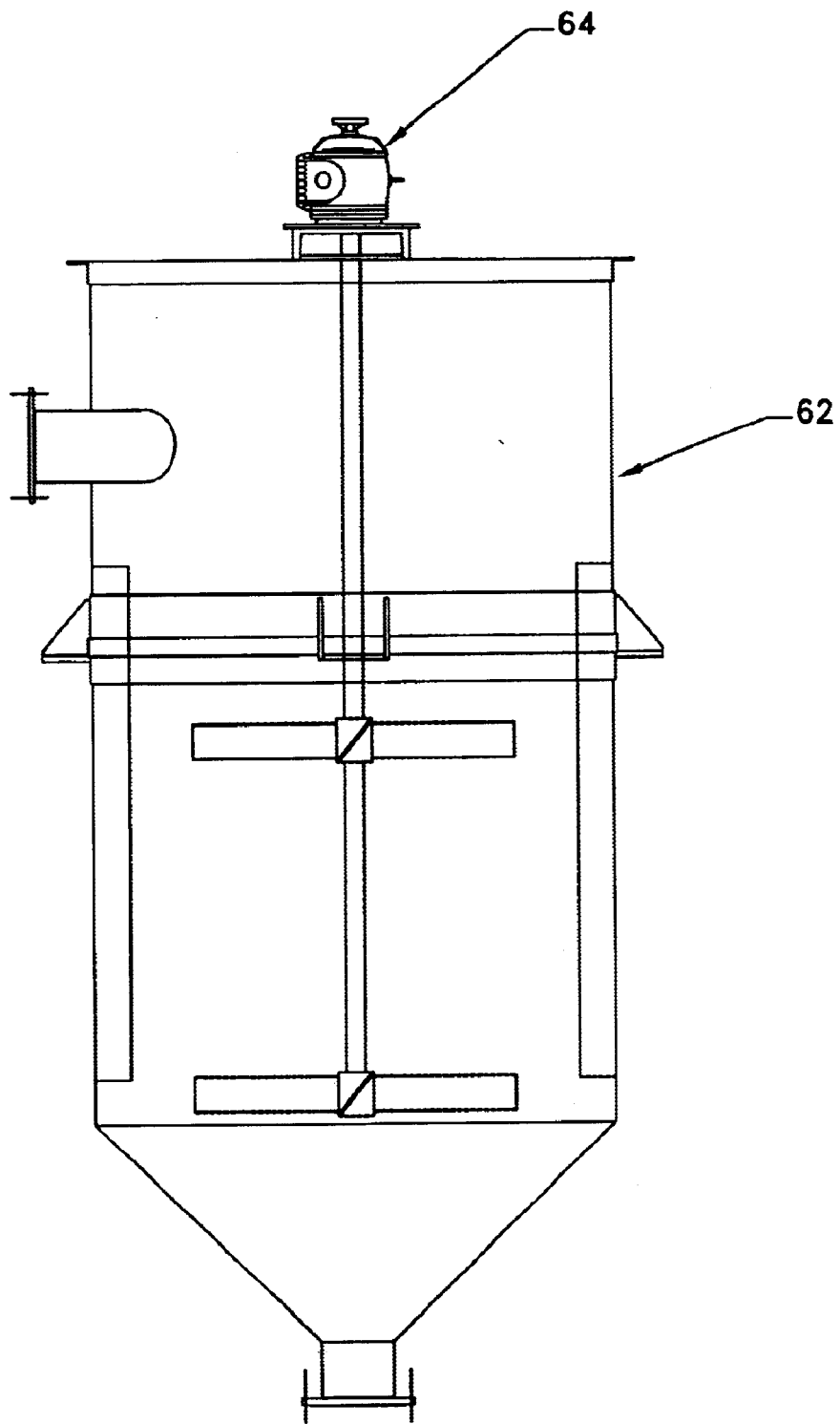
FIG. 2 shows a sectional view of a flocculation tank for use in the system of FIG. 1.

The flocculent introduction station 60 may be a flocculent conduit 61, an in-line mixer, a flocculation tank 62, a combination of an in-line mixer and a flocculation tank, or other mechanism for adding flocculent to the liquid waste sludge. Conventional known polymer flocculents may be used in the present invention, such as a polyacrylamide. The flocculent material may be mixed with the liquid waste sludge by fluid flow, a static mixing device, or by a mechanical mixing device 64. As shown in FIG. 1, flocculent may be added to the liquid waste sludge, by in-line addition 61, just prior to the liquid waste sludge entering the bottom of the flocculation tank 62. From the top of the flocculation tank 62, the liquid waste sludge may flow by gravity or other force into the screw press 30. FIG. 2 shows a sectional view of a flocculation tank 62. The flocculation tank 62 allows for controlled mixing of the sludge and a polymeric flocculent to agglomerate or flocculate the liquid waste sludge so it can be mechanically dewatered. The flocculation tank 62 may be supplied with a variable speed agitator to minimize the mixing energy used in the tank 62.

In one embodiment sufficient mixing is provided to fully disperse the polymer throughout the liquid waste sludge without over agitation, which can damage the floc particles, while at the same time minimizing the polymer consumption of the system. An open top tank 62 may be used which allows operators to easily observe the liquid waste sludge flocculation and make adjustments as required. In applications where odor or harmful gases may be present, a closed top design may be used. In one embodiment the flocculation tank 62 may be sized to have a retention time of 1.5–5.0 minutes. The agitation drive may be 5 HP or less, and may have mechanical variable speed or be variable frequency drive units.

Figure 3:
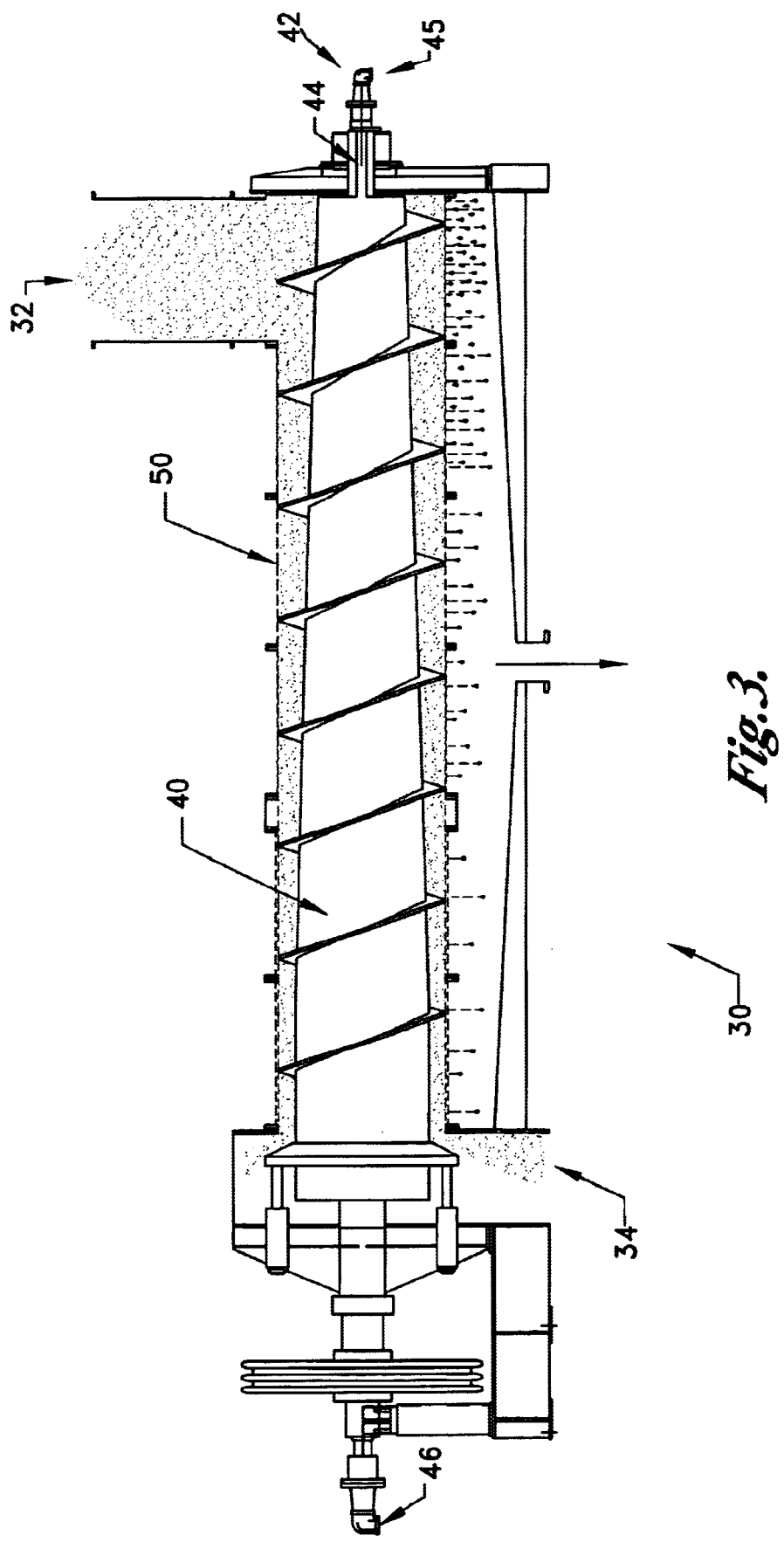
FIG. 3 shows a sectional view of a screw press for use in the system of FIG. 1.

Referring to FIG. 3 the screw press 30 has a liquid waste sludge inlet 32, a sludge solids outlet 34, an outer screen 50, and a screw 40 rotatably located within the outer screen 50. The screen 50 allows the liquid component to pass through and retains a majority of the sludge solids component. Dewatering may be accomplished by slowly squeezing the liquid waste sludge and allowing the liquid component to escape through the perforated screen 50 surrounding the screw 40 while retaining the solids component inside the press 30. Pasteurization occurs as the sludge temperature is raised due to contact with the heated screw 40. The flocculated liquid waste sludge enters the screw press 30 by way of the inlet 32 which may be a headbox. The liquid waste sludge may be conveyed from the inlet 32 to the outlet 34 of the press 30 by the rotating screw 40. As the liquid waste sludge is conveyed along the length of the press 30, it is squeezed between the tapered screw shell 40 and the screen 50. Compression may also occur between the screw flights on variable pitch screw designs. The dewatered sludge exits the press at the outlet 34 and may fall down a discharge box. The liquid component that was forced out through the screen 50 may be collected in a filtrate pan and may flow to a filtrate discharge flange.

Figure 4:
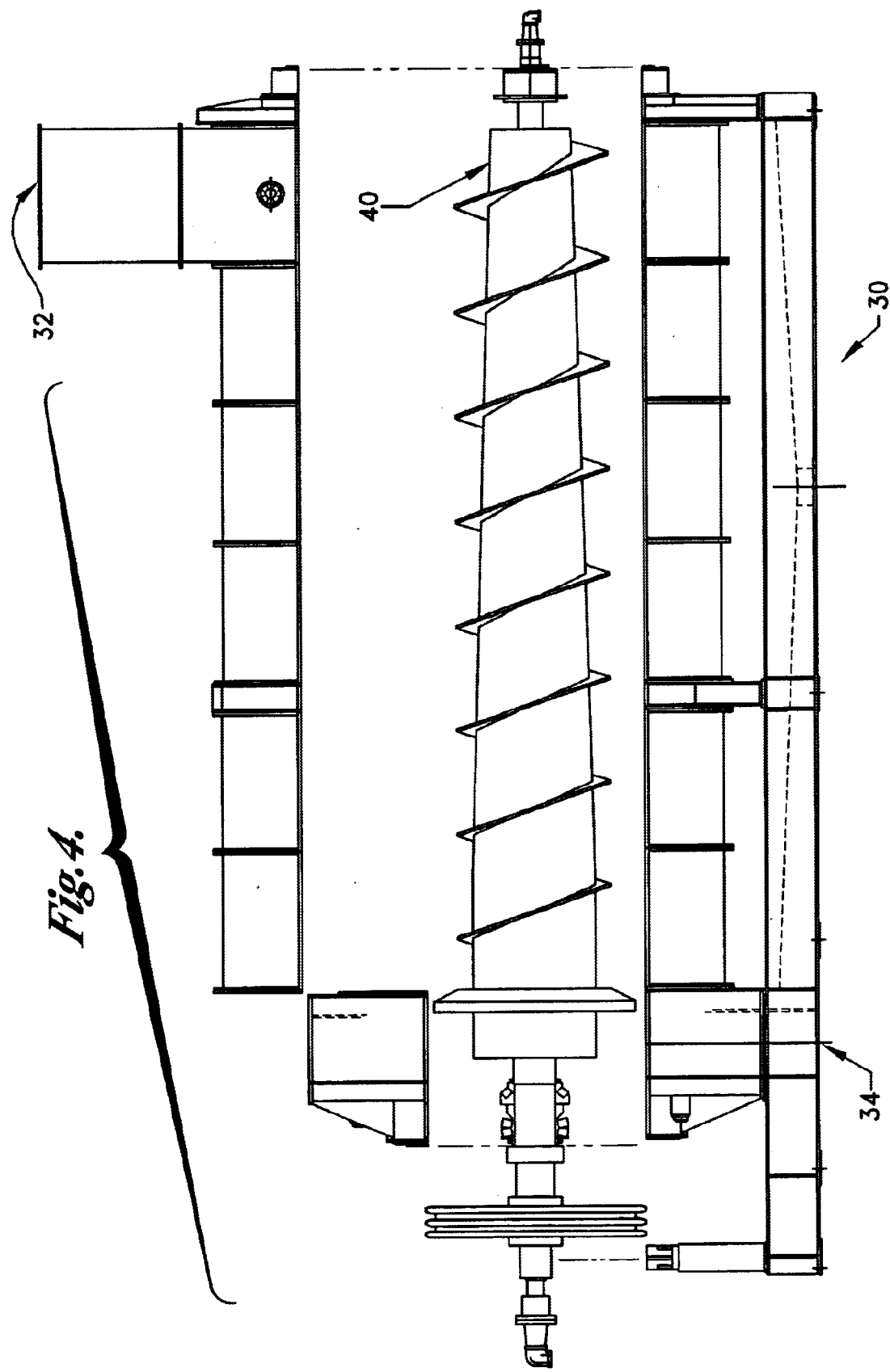
FIG. 4 shows an exploded view of the screw press of FIG. 3.

Referring to FIG. 4, the screw may consist of a tapered shell to which a helical screw flight may be attached. The outside diameter of the helical screw flight may be constant. The tapered shell is generally smallest at the inlet end 32 and largest at the outlet end 34. The screw 40 may be supported at each end by spherical roller bearings. The screw press 30 can be supplied with a final chain/sprocket drive as shown or can be supplied with an in-line mounted gear reducer. The screw 40 rotates inside the screen 50 which may be a series of drums lined with replaceable, perforated, stainless steel screens.

In one embodiment the screw flight may also have a variable pitch. The pitch, which is the distance from flight to flight along the length of the shell, may be larger at the inlet end 32 and smaller at the outlet end 34. With this design, the sludge may be slowly compressed between the screw 40 and the screen 50 and, at the same time, the sludge may be slowly compressed between the screw flights.

Other screw press designs may be used without departing from the present invention, such as: screws with constant shell diameters and variable pitch flight; screws with a tapered screen and constant pitch design; screws with interrupted flights; and screws with a helical screw flight that has a tapered outer diameter where the flight outer diameter may be larger at the inlet end and smaller at the outlet end.

Figure 5:
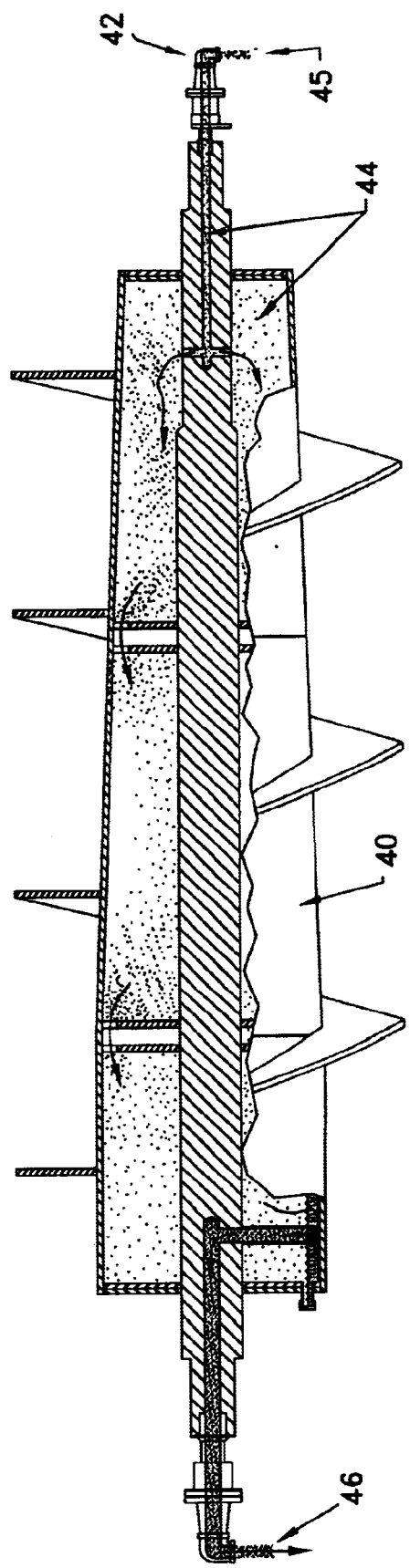
FIG. 5 shows a sectional view of the screw press of FIG. 3 illustrating the heating mechanism of the screw press.

Referring to FIG. 5, the screw 40 has a heating mechanism 42 for heating the liquid waste sludge. The heating mechanism 42 includes a heat source conduit 44 having an inlet 45 and outlet 46. The heat source conduit 44 passes through the screw 40 and extends between the shaft and the shell of the screw. The heat source passes from the inlet 45 to the outlet 46, thereby heating the screw 40 as well as the contents of the screw press 30. The heat source may be steam, a heated liquid, a heated gas, an electrical resistance element, or any other source of heat capable of heating the liquid waste sludge to the desired predetermined amount sufficient for pasteurization. The heat from the heating mechanism 42 not only pasteurizes the sludge but, without being limited by theory, applicant believes that the heat may also aid in dewatering by lysing, or breaking down, the cell walls in the liquid waste sludge which may release intercellular water.

In one embodiment, saturated steam enters the inlet end of the screw 40 through a rotary joint. The steam travels a short distance through a passage in the screw shaft and then into the space between the screw shaft and the tapered screw shell. The steam does not come in contact with the liquid waste sludge. Heat from the steam is transferred through the screw shell to the sludge which is simultaneously dewatered and heated. The steam condenses due to the heat loss and the condensate collects at the discharge end of the screw shell. The condensate is intermittently removed as the screw rotates. The condensate may be blown out through a condensate removal siphon as the siphon pipe dips into and rotates through the condensate during each revolution of the screw 40. The condensate may exit heat source conduit outlet 46 through the rotary joint at the discharge end of the screw 40. The condensate discharge may then be passed through a steam trap, which will close as the siphon rotates out of the condensate, allowing steam to fill the heat source conduit 44. The condensate removal process repeats with the next revolution of the screw 40.

While the heat source conduit 44 has been described above as having a heat source inlet 45 at the sludge inlet 32 end of the screw press 30, and a heat source outlet 46 at the sludge outlet 34 end of the screw press 30, other embodiments may be used without departing from the present invention. In one embodiment the heat source inlet 45 and outlet 46 could be positioned at the inlet 32 end of the screw press 30. In another embodiment the heat source inlet 45 and outlet 46 could be positioned at the outlet 34 end of the screw press 30.

In one embodiment the screw press 30 of the present invention may operate at a screw speed range of 0.03 to 0.3 rpm. The screw may also have 8 to 15 pitches. This combination results in a sludge retention time range of 26.7 minutes to 500 minutes. This relatively long retention time allows the sludge to come up to the required temperature then be slowly conveyed at that temperature for the required amount of time for pasteurization.

Figure 6:
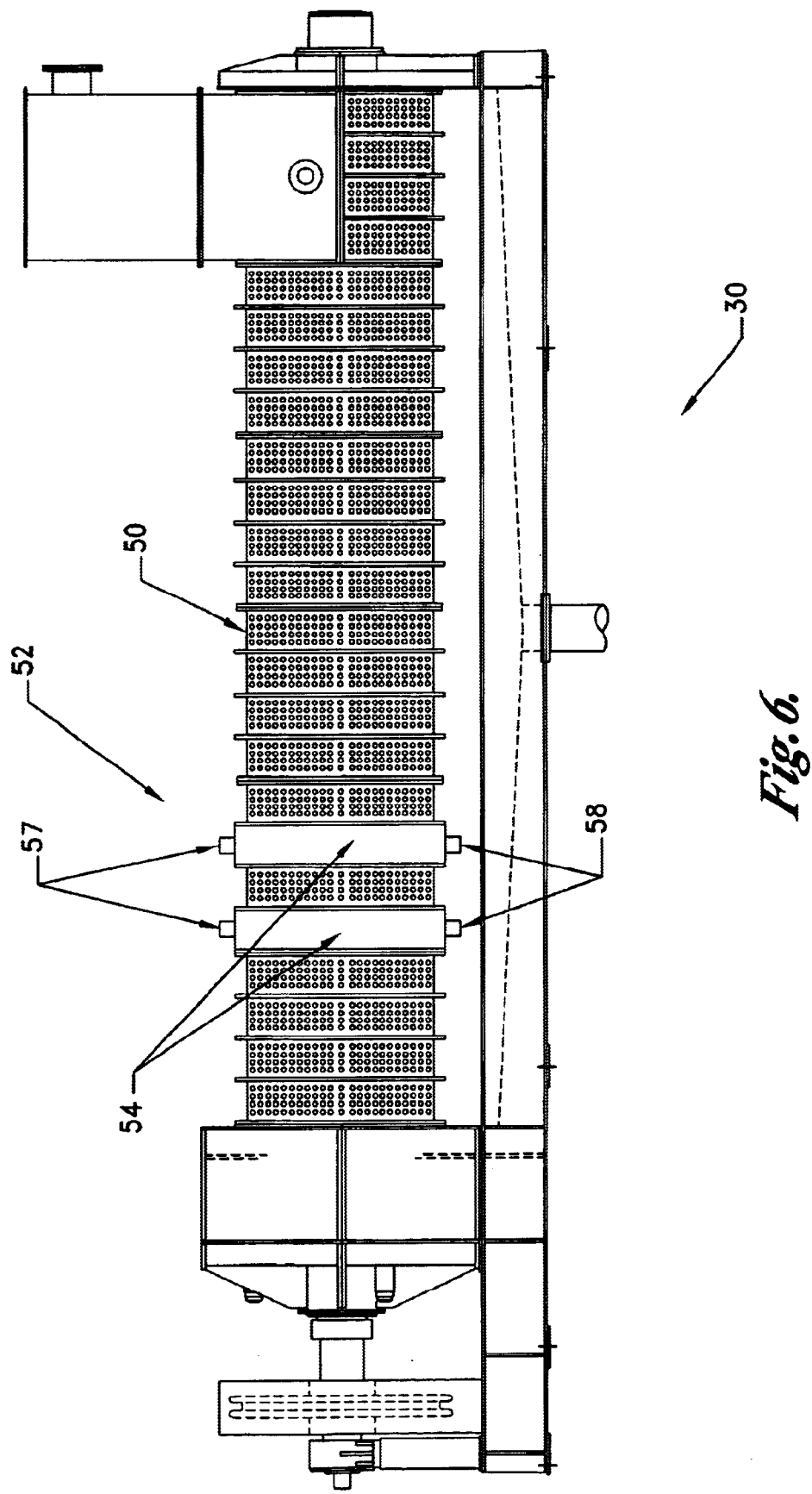
FIG. 6 shows a side view of an alternate screw press for use in FIG. 3 with heated drums.
Figure 7:
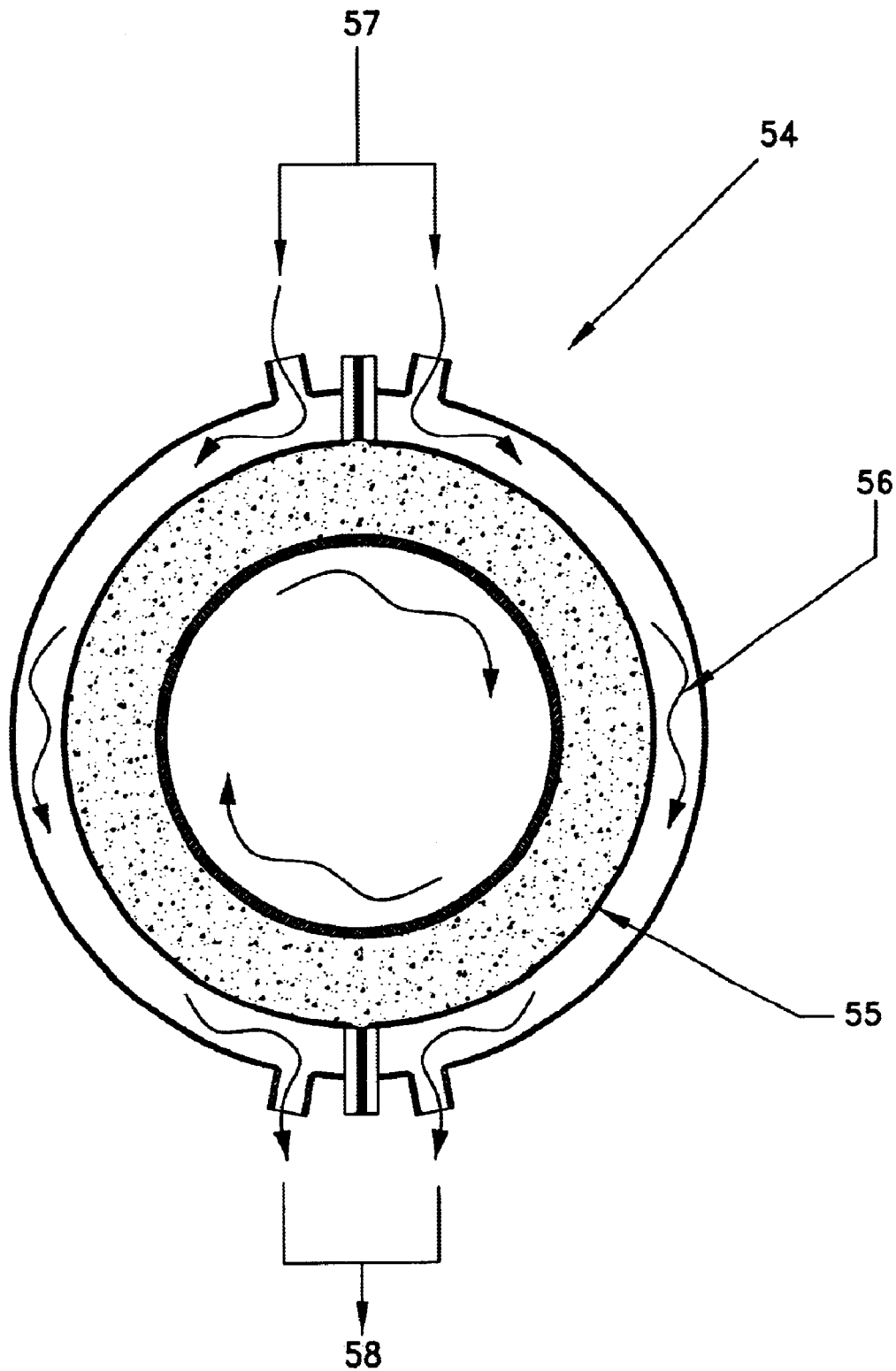
FIG. 7 shows a sectional view of a heated drum with a solid inner wall.
Figure 8:
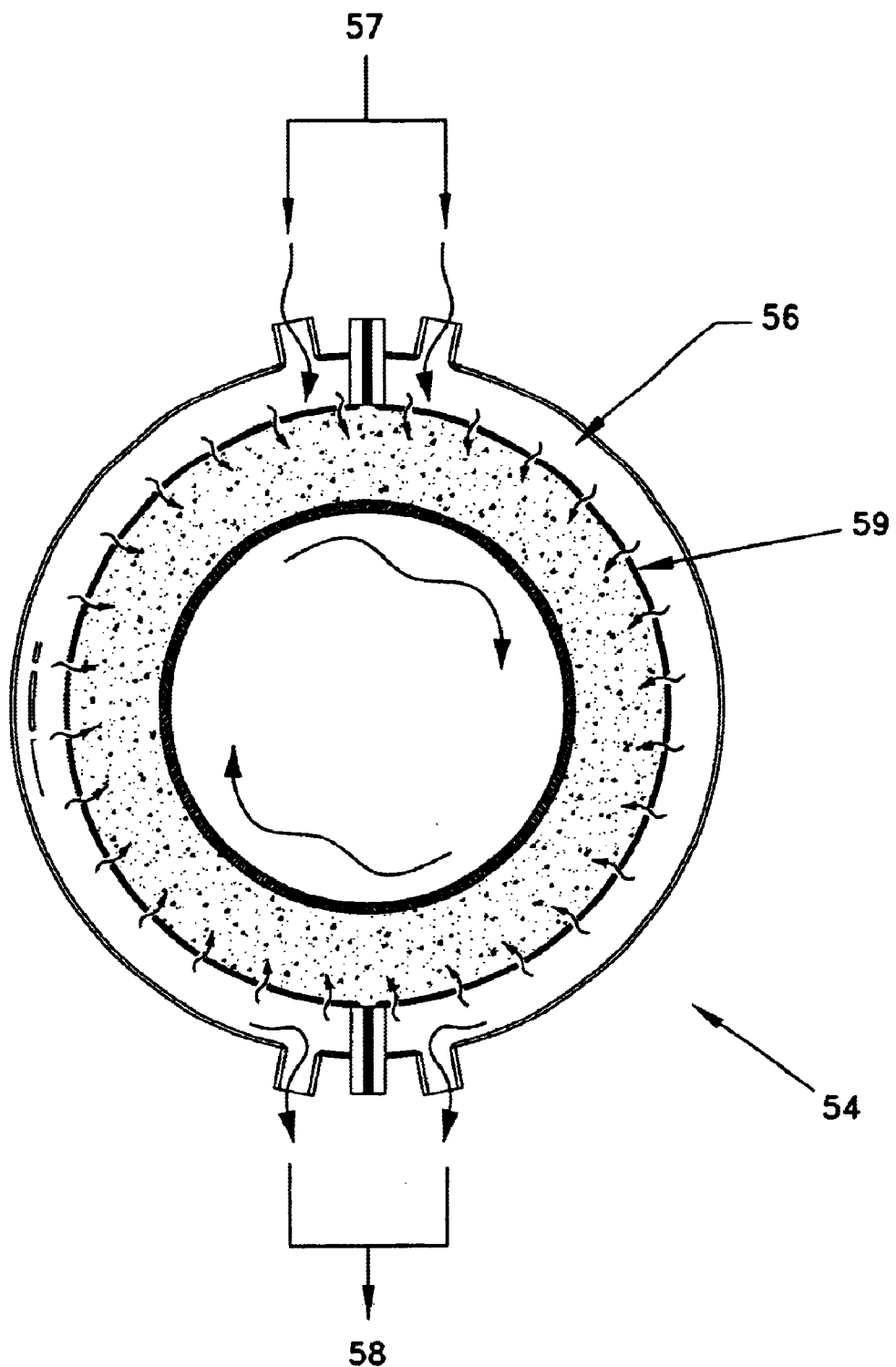
FIG. 8 shows a sectional view of a heated drum with a perforated inner wall.

Referring to FIG. 6, the screw press 30 may further include a second heating mechanism 52 which may be a heated drum 54 Referring to FIG. 7, the heated drum 54 may have an inner wall 55 in place of a portion of the screw press outer screen 50, a second heat source conduit 56 having an inlet 57 and outlet 58. Referring to FIG. 8, the heated drum 54 may have a perforated inner wall 59 in place of a portion of the screw press outer screen 50. A second heat source passes from the inlet 57 to the outlet 58 thereby heating the contents of the screw press 30. The second heat source may be steam, a heated liquid, a heated gas, an electrical resistance element, or any other source of heat capable of heating the liquid waste sludge.

If the screw 40 is the only component that is heating the sludge, a heat gradient is created where the sludge next to the screw 40 is the hottest and the sludge next to the screen 50 is the coldest. If the sludge next to the screen 50 is not quite hot enough for pasteurization, a heated drum 54 could be used for additional heat transfer from the outside. The heated drum 54 could be used to heat the outer layer of sludge, that is, the layer of sludge next to the screen 50.

The heated drum 54 transfers heat by conduction (for solid wall drums) and a combination of conduction and convection (for perforated walls) into the sludge through the inner wall 55. The outer wall is suitably insulated to improve energy efficiency. If steam is used to heat the exterior drum as the second heat source, condensate collects inside the heated drum 54 and is removed from the outlet 58 of the drum 54. Referring to FIG. 8, the heated drum 54 has a solid outer wall and a perforated or porous inner wall 59. The perforated wall 59 allows steam to flow through the perforations in the inner wall 59 and into the sludge with excess steam and condensate escaping through a bleed valve. With the steam flowing directly into the sludge the steam would quickly condense in the sludge and heat the outer sludge layer directly. As the sludge is conveyed by the screw flights from the heating drum 54, the condensate added to the outer layer of sludge is pressed out of the sludge.

Figure 9:
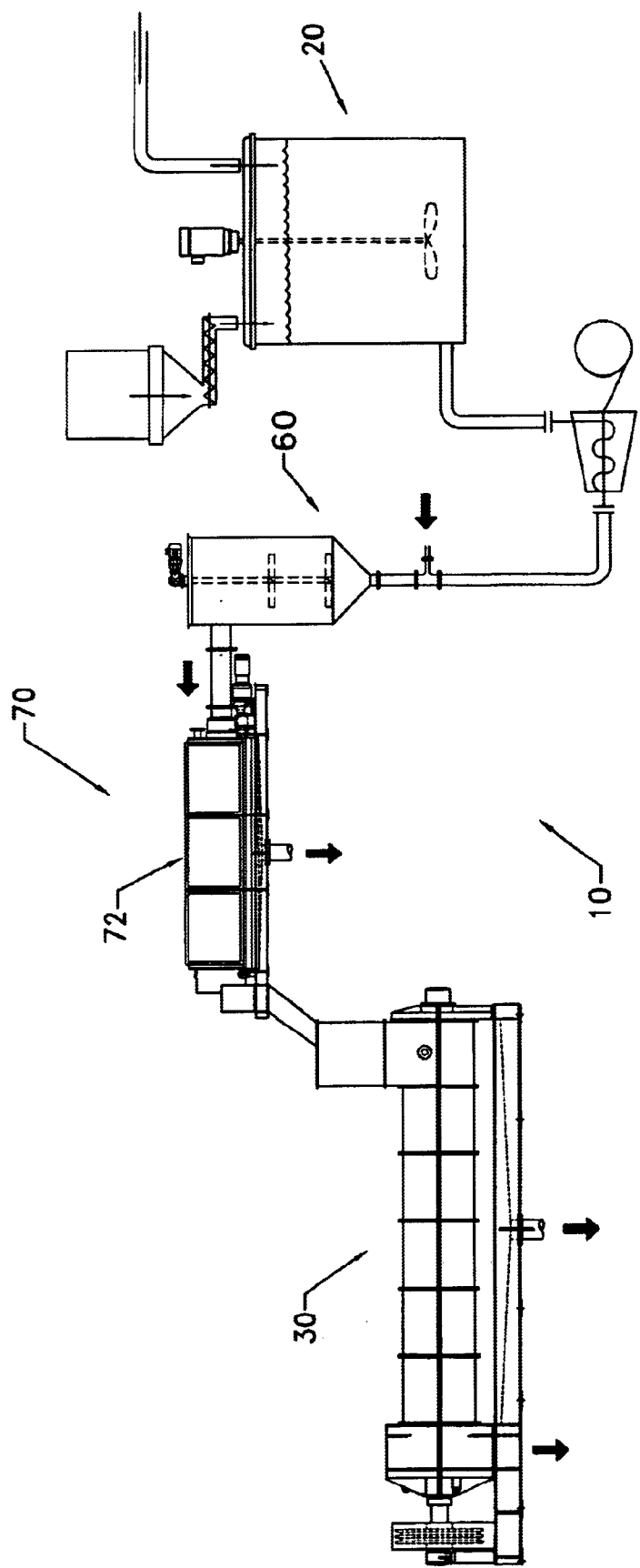
FIG. 9 shows an alternate embodiment of a sludge dewatering and pasteurization system of the present invention including a prethickener device.

Referring to FIG. 9, the sludge dewatering and pasteurization system 10 for dewatering, pasteurizing, and vector attraction reduction in liquid waste sludge may further include a prethickener device 70 located in the third conduit 83 for removing a portion of the liquid component from the liquid waste sludge prior to entry into the screw press. In one embodiment the prethickener device 70 is a rotary screen thickener 72, however, the prethickener device may be a gravity belt thickener or any other device capable of removing a portion of the liquid component from the liquid waste sludge prior to entry into the screw press.

In one embodiment the prethickener device 70 may be used where the liquid waste sludge has a low sludge solids content (less than 4.0% solids). The prethickener may remove a large portion of the water from the liquid waste sludge before the liquid waste sludge is fed to the screw press 30. With thicker liquid waste sludge being fed to the screw press 30, the capacity of the screw press 30 increases and the energy requirements decrease.

In addition to the embodiments described herein it will be understood that a retention device may be used to maintain the temperature of sludge solids after the sludge solids have exited the screw press to continue the pasteurization process. In this embodiment the screw press must apply sufficient heat to raise the average temperature of the sludge solids to a level that can accomplish pasteurization when maintained. In a preferred embodiment the sludge solids are retained in the screw press for at least 20 minutes. In a more preferred embodiment the sludge solids are retained in the screw press for at least 30 minutes. The retention device may be a heated and insulated chute, a heated and insulated screw conveyor, or other device capable of maintaining the temperature of sludge solids after the sludge solids have exited the screw press to continue the pasteurization process.

In addition to the embodiments described herein it will be understood that a preheating device may be used to raise the temperature of the liquid waste sludge prior to the simultaneous heating and dewatering of the liquid waste sludge. The preheating device may be a heat exchanger or other device capable of raising the temperature of the liquid waste sludge prior to the simultaneous heating and dewatering of the liquid waste sludge.

The present invention also provides a process for dewatering and reducing pathogens in liquid waste sludge having a liquid component and a sludge solids component. The liquid waste sludge is fed into a screw press 30. The liquid waste sludge is simultaneously heated and dewatered in the screw press 30 for sufficient period of time and at a predetermined temperature for sludge solids component from the screw press 30 to be pasteurized.

It will be understood that as used herein the term "liquid waste sludge" includes a liquid component and a sludge solids component, and includes but is not limited to bioorganic sludge, sewage sludge, waste water sludge. The liquid waste sludge may have a water content of 90% or more by weight. The term "liquid component" may include a portion of sludge solids. The term "sludge solids component" includes but is not limited to biosolids and dewatered sludge. "Dewatered Sludge" can be composed of biological solids, inorganic solids and 40%–90% moisture content. While municipal waste sludge is focused on primarily herein, the same concerns may arise from other types of sludge, such as fish and other food processing waste sludge, that require pathogen reduction.

It will be understood that as used herein the term "pasteurize" includes but is not limited to direct or indirect heating of sludge solids to achieve: pathogen reduction by reducing the density of fecal coliforms in the sludge solids to less than 1,000 most probable numbers (MPN) per gram total solids (dry-weight basis); pathogen reduction by reducing the density of Salmonella sp. bacteria in the sludge solids to less than 3 MPN per 4 grams of total solids (dry-weight basis); or heat treatment for a time period equal to or greater than the time period defined by the following equation: $D=131,700,000/(10^{0.14t})$ where "D" is the number of days for a minimum of 20 minutes (required of EPA Part 503) and "t" is temperature in Celsius at a minimum of 50 degrees. Preferably but not necessarily, the dewatered sludge produced by the present invention meets all of these requirements.

In a preferred embodiment, the heating of the sludge solids in the screw press 30 is controlled for a time period equal to or greater than defined by the following equation: $D=131,700,000/(10^{0.14t})$ where "D" is the number of days for a minimum of 20 minutes and "t" is temperature in Celsius at a minimum of 50 degrees.

In another embodiment the heating of the sludge solids in the screw press 30 achieves sufficient period of time and at a predetermined temperature to reduce the density of fecal coliforms in the sludge solids to less than 1,000 MPN per gram total solids dry-weight basis.

In another embodiment the heating of the sludge solids in the screw press 30 achieves sufficient period of time and at a predetermined temperature to reduce the density of Salmonella sp. bacteria in the sludge solids to less than 3 MPN per 4 grams of total solids dry-weight basis.

In one embodiment of the present invention, a process is provided for dewatering and reducing pathogens in liquid waste sludge having a liquid component and a sludge solids component. Alkaline material is added to the liquid waste sludge. Flocculent may then be mixed with the liquid waste sludge. The liquid waste sludge is then fed into a screw press 30 having a screw 40. The screw press 30 simultaneously heats and dewaters the liquid waste sludge for sufficient period of time and at a predetermined temperature for sludge solids component from the screw press 30 to be pasteurized.

It will be understood that as used herein the term "alkaline material" includes but is not limited to sodium hydroxide, sodium aluminate, lime, fly ash, kiln dust, and wood ash.

It will be understood that as used herein the term "flocculent" includes but is not limited to polymeric flocculent.

In another embodiment a process is provided to achieve pasteurization and vector attraction reduction. Alkaline material is added to the liquid waste sludge sufficient for vector attraction reduction. Flocculent may then be mixed with the liquid waste sludge. The liquid waste sludge is then fed into a screw press 30 having a screw 40. The screw press 30 simultaneously heats and dewaters the liquid waste sludge for a sufficient period of time and at a predetermined temperature for sludge solids component from the screw press 30 to be pasteurized. The pathogen pasteurization and vector attraction reduction being sufficient for the sludge solids component to qualify as Class A sludge.

It will be understood that as used herein the term "Class A sludge" includes sludge that has undergone treatment so as to achieve pathogen reduction and vector attraction reduction per 40 Code of Federal Regulations Sections 503.32 and 503.33 incorporated herein by reference.

It will be understood that as used herein the term "pathogen reduction" includes but is not limited to pathogen reduction by reducing the density of fecal coliforms in the sludge solids to less than 1,000 most probable numbers (MPN) per gram total solids (dry-weight basis), or pathogen reduction by reducing the density of Salmonella sp. bacteria in the sludge solids to less than 3 MPN per 4 grams of total solids (dry-weight basis).

It will be understood that as used herein the term "vector attraction reduction" includes but is not limited to the reduction of the attractiveness of sludge solids to vectors to an acceptable level as defined by the permitting regulatory authority, or the sludge solids component is treated by alkali stabilization.

It will be understood that as used herein the term "alkali stabilization" includes but is not limited to adding alkaline material to raise the pH of the sludge solids component at or above 12.0 pH for 2 hours or more and maintain the pH of the sludge solids component at or above 11.5 for an additional 22 hours.

In one embodiment vector attraction reduction may be achieved by adding the alkaline material to the liquid waste sludge until the pH of the sludge has reached or surpassed the required level of pH for vector attraction reduction. This may be done by adding the alkaline material to the liquid waste sludge until the pH of the sludge is raised to maintain a pH of equal to or greater than 12 for 2 hours, and then to further maintain a pH equal to or greater than 11.5 for an additional 22 hours.

In a further aspect of the invention, coagulant may be added to the liquid waste sludge prior to flocculation, followed thereafter by simultaneous heating and dewatering the liquid waste sludge. The coagulant helps firm up the liquid waste sludge prior to dewatering. It will be understood that as used herein the term "coagulant" includes but is not limited to sodium aluminate, or other materials with high electrical charge.

In another aspect of the invention, the pasteurized and dewatered sludge solids are discharged from the screw press having a water content between 90% and 40% by weight.

In a still further aspect of the invention, the liquid waste sludge may be prethickened prior to the simultaneous heating and dewatering step by removing at least a portion of the liquid from the liquid waste sludge.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A process for dewatering and reducing pathogens in liquid waste sludge, having a liquid component and a sludge solids component, comprising:
    adding an alkaline material to the liquid waste sludge;
    mixing flocculent with the liquid waste sludge;
    feeding the liquid waste sludge into a screw press having a screw; and
    simultaneously heating the screw and dewatering the liquid waste sludge in the screw press for sufficient period of time and at a predetermined temperature for sludge solids component from the screw press to be pasteurized, wherein the heating of the sludge solids in the screw press is for a time period equal to or greater than defined by the following equation:

$$D = 131{,}700{,}000/(10^{0.14t})$$

where "D" is the number of days for a minimum of 20 minutes and "t" is a temperature in Celsius at a minimum of 50 degrees.

2. The process of claim 1, wherein the liquid waste sludge has a water content of 90% or more by weight.

3. The process of claim 1, wherein the alkaline material is selected from the group consisting of sodium hydroxide, sodium aluminate, lime, fly ash, kiln dust, and wood ash.

4. The process of claim 1, wherein the alkaline material is added to the liquid waste sludge until the pH of the sludge has reached or surpassed the required level of pH for vector attraction reduction.

5. The process of claim 4, wherein the alkaline material is added to the liquid waste sludge until the pH of the sludge is raised to maintain a pH of equal to or greater than 12 for 2 hours, and then to further maintain a pH equal to or greater than 11.5 for an additional 22 hours.

6. The process of claim 1, further comprising the step of adding coagulant to the liquid waste sludge prior to flocculation, followed by simultaneous heating and dewatering the liquid waste sludge.

7. The process of claim 1, wherein the screw press has an outer screen and wherein the process further comprises the step of simultaneously heating the screw, heating the outer screen and dewatering the liquid waste sludge in the screw press.

8. The process of claim 7, wherein the outer screen includes a heated drum.

9. The process of claim 1, wherein the screw can be heated by steam, hot liquid, electric resistance elements, or combinations thereof.

10. The process of claim 1, wherein the heating of the sludge solids in the screw press achieves sufficient period of time and at a predetermined temperature to reduce the density of fecal coliforms in the sludge solids to less than 1,000 MPN per gram total solids dry-weight basis.

11. The process of claim 1, wherein the heating of the sludge solids in the screw press achieves sufficient period of time and at a predetermined temperature to reduce the density of Salmonella sp. bacteria in the sludge solids to less than 3 MPN per 4 grams of total solids dry-weight basis.

12. The process of claim 1, further comprising the step of discharging pasteurized and dewatered sludge solids from the screw press having a water content between 90% and 40% by weight.

13. The process of claim 1, further comprising the step of prethickening the liquid waste sludge prior to the simultaneous heating and dewatering step by removing at least a portion of the liquid from the liquid waste sludge.

14. A process for dewatering and pasteurizing liquid waste sludge, having a liquid component and a sludge solids component, comprising:

feeding the liquid waste sludge into a screw press; and simultaneously heating and dewatering the liquid waste sludge in the screw press for sufficient period of time and at a predetermined temperature for sludge solids component from the screw press to be pasteurized, wherein the heating of the sludge solids in the screw press is for a time period equal to or greater than defined by the following equation:

$$D=131{,}700{,}000/(10^{0.14t})$$

where "D" is the number of days for a minimum of 20 minutes and "t" is a temperature in Celsius at a minimum of 50 degrees.

15. A process for dewatering and reducing pathogens in liquid waste sludge, having a liquid component and a sludge solids component, comprising:

adding an alkaline material to the liquid waste sludge;

feeding the liquid waste sludge into a screw press having a screw; and simultaneously heating and dewatering the liquid waste sludge in the screw press for sufficient period of time and at a predetermined temperature for sludge solids component from the screw press to be pasteurized, wherein the heating of the sludge solids in the screw press is for a time period equal to or greater than defined by the following equation:

$$D=131{,}700{,}000/(10^{0.14t})$$

where "D" is the number of days for a minimum of 20 minutes and "t" is a temperature in Celsius at a minimum of 50 degrees.

* * * * *